United States Patent [19]

Wheeler

[11] 4,113,206

[45] Sep. 12, 1978

[54] LIGHTER-THAN-AIR APPARATUS AND METHOD OF UTILIZING SAME

[76] Inventor: David C. Wheeler, 240 Tower Rd., Barrington, Ill. 60010

[21] Appl. No.: 797,290

[22] Filed: May 16, 1977

[51] Int. Cl.² .................................................. B64B 1/40
[52] U.S. Cl. ...................................... 244/31; 244/125; 244/126
[58] Field of Search ...................... 244/125, 30, 31, 33, 244/126

[56] References Cited

U.S. PATENT DOCUMENTS

| 205,319 | 6/1878 | Tracy | 244/125 |
|---|---|---|---|
| 1,390,745 | 9/1921 | Armstrong | 244/30 |
| 1,553,087 | 9/1925 | Lehmann | 244/126 |
| 2,767,941 | 10/1956 | Gegner et al. | 244/31 |
| 3,182,932 | 5/1965 | Winker | 244/31 |
| 3,311,328 | 3/1967 | Slater | 244/31 |

FOREIGN PATENT DOCUMENTS 8,754 of 1913 United Kingdom ...................... 244/125

Primary Examiner—Barry L. Kelmachter
Attorney, Agent, or Firm—Bernard L. Kleinke

[57] ABSTRACT

Lighter-than-air apparatus includes a thin, pliable airtight outer envelope disposed in overlying relationship over a light-weight, coarse-opening inner frame of a spherelike shape. The envelope includes a sealable opening therein, so that the envelope can be at least partially evacuated to render the apparatus lighter than air. A vacuum pump is provided and is connected in fluid communication with the opening for controlling the quantity of air contained in the envelope to determine the amount of lifting energy. In one form of the invention, an outer frame is disposed within the envelope and surrounding the inner frame, and the outer frame is composed of a stiff, rigid open-mesh material with the openings in the inner frame being smaller in size than the opening in the outer frame.

10 Claims, 3 Drawing Figures

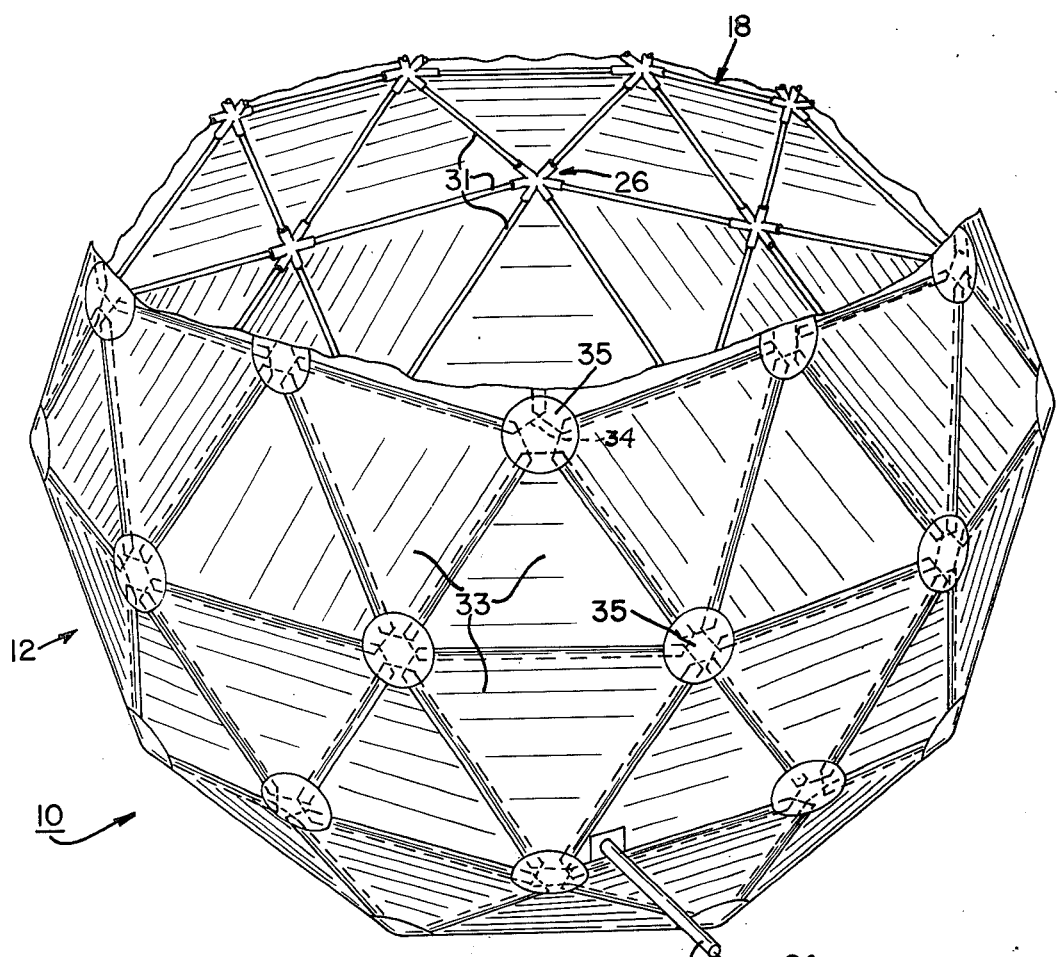
FIG-1-
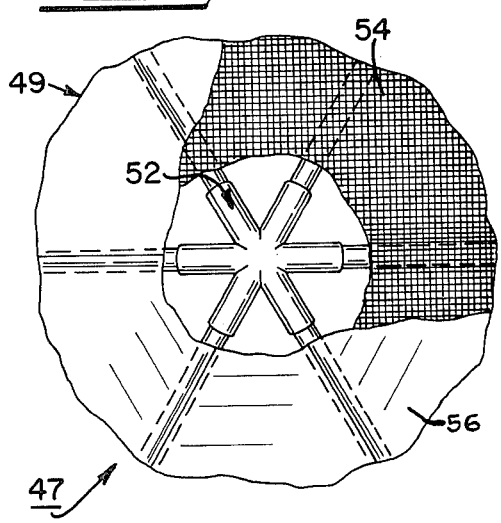
FIG-3-
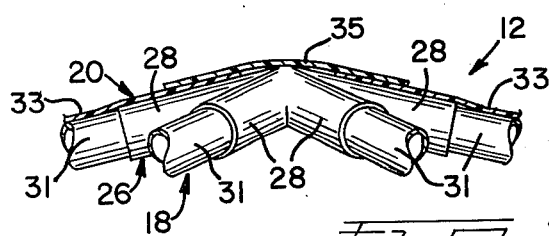
FIG-2-

LIGHTER-THAN-AIR APPARATUS AND METHOD OF UTILIZING SAME

The present invention relates in general to lighter-than-air apparatus and method of utilizing same, and it more particularly relates to apparatus which is lighter than air and which may be used as aircraft or any other purpose that a lighter-than-air balloon may be used.

Many different types and kinds of lighter-than-air apparatus have been employed in the past. For example, reference may be made to the following U.S. patents which disclose various different lighter-than-air devices and other structures of similar design: U.S. Pat. Nos. 770,626; 1,332,107; 2,934,075; 2,961,194; 3,073,556; 3,107,884; 3,131,895; 3,195,834; 3,248,735; 3,369,774; 3,405,886; and 3,839,631. However, the devices shown in the foregoing patents as well as other well-known and conventional lighter-than-air devices, such a helium-filled balloons and dirigibles, have not been entirely satisfactory for some applications. In this regard, it is extremely expensive to fill a dirigible with helium, and the helium as well as other examples of lighter-than-air gases are extraordinarily dangerous since they are very combustible. Also, in the case of hot air balloons, and the like devices, it is expensive to heat the air and natural resources are consumed in an inefficient manner since they must be burned, and the products of combustion are released to the air, resulting in air pollution. Therefore, it would be highly desirable to have lighter-than-air apparatus which is relatively inexpensive to manufacture and use, and which is operated in a relatively efficient manner, while conserving natural resources without polluting the atmosphere.

Therefore, the principal object of the present invention is to provide new and improved lighter-than-air apparatus which is relatively inexpensive to manufacture and use and which does not waste unnecessarily natural resources and does not cause unnecessarily air pollution.

Briefly, the above and further objects of the present invention are realized by providing lighter-than-air apparatus and a method of utilizing same, which lighter-than-air apparatus includes a thin, pliable air-tight outer envelope disposed in overlying relationship over a light-weight, coarse-opening inner frame of a spherelike shape. The envelope includes a sealable opening through which air is withdrawn from the interior of the envelope to render the apparatus lighter than air and thus to provide lifting energy. In one form of the present invention, the inner frame is surrounded by an outer frame within the envelope, and the outer frame is composed of a stiff, rigid mesh material, the openings therein being smaller than the openings in the inner frame to provide additional support for the envelope. Thus, there is no need for filling the envelope with a lighter-than-air gas, but instead by evacuating the envelope, the lifting energy is provided in a manner which is relatively inexpensive and which does not unnecessarily and unwantedly consume natural resources in a manner that does not pollute the atmosphere.

The invention, both as to its organization and method of operation, together with further objects and advantages thereof, will best be understood by reference to the following detailed description taken in connection with the accompanying sheet of drawings, wherein:

FIG. 1 is a partly pictorial representation of the apparatus and a partly schematic showing thereof, the apparatus being constructed in accordance with the present invention;

FIG. 2 is a fragmentary cross-sectional view of a detailed portion of the apparatus of FIG. 1 shown in an enlarged scale; and FIG. 3 is a fragmentary detail view of another lighter-than-air apparatus, which is also constructed in accordance with the present invention.

Referring now to the drawings, and more particularly to FIG. 1 and FIG. 2 thereof, there is shown a lighter-than-air apparatus 10, which is constructed in accordance with the present invention. The lighter-than-air apparatus 10 generally comprises a balloon 12 having a lift control means 13 which controls and evacuates gases from the interior of the balloon 12 to render it lighter than air for lifting purposes. It should be understood by those skilled in the art that the lift control means 13 may be carried by the balloon 12 in a conventional manner when the apparatus 10 is used as an aircraft vehicle, but the lift control means 13 may be employed in a stationary manner on the ground when the balloon 12 is tethered to the ground. Also, the lift control means 13 may be employed or mounted on a vehicle, such as a ship or a railroad train.

The control means 13 includes a vacuum pump 14 which is connected in fluid communication with the interior of the balloon 12 through a three-way valve 16 which will be hereinafter described in greater detail. The balloon 12 generally includes an open geodesic spherelike frame 18, and an airtight envelope 20 which surrounds the frame 18. A sealable stem opening 22 to the interior of the envelope 20 has a conduit 24 which connects the opening 22 in fluid communication with the three-way valve 16, whereby the pump 14 can evacuate the interior of the envelope 20 and the light-weight frame 18 supports the envelope 20 and prevents it from imploding.

Considering now the frame 18 in greater detail with reference to the drawings, frame 18 is an open frame of light-weight construction and, in the preferred form of the present invention, is of a geodesic spherelike construction. Such a geodesic construction is preferred, since it has the greatest strength for this type of application. While a spherelike shape is preferred and is illustrated in the drawings, it is to be understood that other different types of shapes, such as eliptical shapes, may also be employed. In this regard, the basic geodesic construction, as is well known in the art, can be employed to make the inner frame of the balloon 12 of either a sphere shape or an eliptical shape.

The frame 18 includes a large number of vertices, such as the vertex 26 having six tubular sockets 28. According to well known geodesic constructions, different kinds of vertices are employed in the same structure. In the frame 18, tubular struts 31 interconnect the vertices to form a rigid open frame for the balloon 12. The ends of the struts 31 fit into the tubular sockets of the vertices, as indicated in the drawings in a fixed manner.

The vertices may be composed of steel material, and the struts may be composed of aluminum tubular stock. However, it is to be understood that various different types and kinds of materials may be employed for the vertices and struts. For example, it may become apparent to those skilled in the art that suitable plastic materials may also be employed.

The frame 18 is in the form of a geodesic grid. The geodesic grid is the conventional geodesic-type construction, and is in the form of an open frame having triangular openings therein.

Considering now the envelope 20 in greater detail, with reference to the drawings, the envelope is spherical in shape and closely overlies the frame 18. The envelope is airtight and is composed of thin, flexible light-weight material having great tensile strength. In the preferred form of the present invention, the material is mylar film.

As shown in the drawings, the envelope 20 generally comprises a plurality of triangularly shaped sheets 33 which are positioned over the frame 18 in an overlapping manner as shown in the drawings. In this regard, the triangular sheets 33 overlap and extend over three struts 31, and each sheet 33 overlaps at its three marginal edges three marginal edges of three adjacent similar sheets. The sheets 33 are sealed together at their overlapping marginal edge areas by any suitable technique, such as by applying a double face tape, sprayed adhesive material or the like.

It should be noted that each one of the triangularly shaped sheets 33 has three cut-off corners, such as the corner 34, so that the triangular sheets do not cover over the vertices.

A plurality of vertex caps 35 in the form of circular sheets of thin, flexible material, such as mylar film, cover over the vertices and are sealed to the sheets 33 to complete the envelope 20. The vertex caps 35 are composed of the same material as the sheets 33, and they are secured to the sheets 33 in the same manner that the sheets 33 are sealed to one another.

Considering now the lift control means 13 in greater detail with reference to FIG. 1 of the drawings, the lift control means 13 determines the state of evacuation of the balloon 12. In this regard, the pump 14 withdraws gas from the interior of the balloon 12 until a sufficient lift is created. Thereafter, the pump 14 is turned off and the three-way valve 16 is connected in a position to prevent any further gas from leaving or entering the interior of the balloon 12.

In order to lower or decrease the lift of the balloon 12, the three-way valve 16 is adjusted to permit gas to enter the interior of the balloon 12 through the stem opening 22 in a selective manner.

The three-way valve 16 has four ports 37, 39, 41 and 43. The port 37 is connected in fluid communication with one end of the conduit 24, and the port 39 is connected in fluid communication with the pump 14. A hollow movable valve member 45 is positionally adjustable to connect in fluid communication adjacent pairs of the ports. In this regard, as shown in FIG. 1 of the drawings, the valve member 45 in one of its positions interconnects in fluid communication the conduit 24 and the pump 14 to withdraw gases from the interior of the balloon 16. When the valve member 45 interconnects the port 37 with the port 42, gases are permitted to enter from the atmosphere through the port 42 into the conduit 24 and from there into the interior of the balloon 16 via the stem opening 22 for decreasing the lift. In its third position, the valve member 45 interconnects in fluid communication the two open ports 41 and 42, thereby effectively closing off the opening 22 to the interior of the balloon 16 to maintain its present state of evacuation and thus its lift.

As will become apparent to those skilled in the art, the lifting energy, resulting from the evacuation of the interior of the balloon 16, must overcome the entire weight of the balloon 12, as well as the weight of any objects, such as the lift control means 13, carried by it. At greater pressure differentials, the frame must support greater forces exerted on the envelope 20. Therefore, a higher frequency geodesic grid for the frame 18 may be employed to withstand the greater forces. However, the greater frequency or repetition of the triangular openings in the frame 18 causes the overall weight of the frame 18 to increase. Hence, on the one hand, there must be a sufficient number of repetitions of the geodesic frame 18 to provide sufficient strength to withstand the pressures exerted on the envelope 20, but on the other hand, the repetitions cannot be too great that the overall weight of the frame 18 becomes prohibitive.

Referring now to FIG. 3 of the drawings, there is shown another lighter-than-air apparatus 47, which is also constructed in accordance with the present invention. The apparatus 47 is similar in construction to the apparatus 10, except that the apparatus 47 includes additional internal supporting members for the envelope. The apparatus 47 generally includes a balloon 49 which is evacuated by means of a lift control means (not shown) similar to the lift control means of FIG. 1.

The balloon 49 includes an open geodesic spherelike frame 52. which is similar in construction to the frame 18 of the apparatus 10. Surrounding the frame 52 is a wire-mesh, spherelike outer frame 54 having smaller openings therein, as compared to the larger triangularly shaped openings in the geodesic frame 52. An envelope 56, similar in construction to the envelope 20, overlies the outer mesh frame 54. As a result, the inner and outer frames 52 and 54 provide better support for the envelope 56 without the necessity of having a higher frequency geodesic frame and the additional weight associated therewith.

While particular embodiments of the particular invention have been disclosed, it is to be understood that various different modifications are possible and are contemplated within the true spirit and scope of the appended claims. For example, it may well be possible to construct the envelope for the balloon in different manners. There is no intention, therefore, of limitation to the exact abstract or disclosure herein presented.

What is claimed is:

1. Lighter-than-air apparatus, comprising:

a light-weight inner rigid frame of spherelike shape having coarse openings therein, said frame including a plurality of light weight elongated members joined fixedly together at their ends to form a geodesic shape;

a thin, pliable air-tight outer envelope disposed in overlying relationship over said frame, said envelope having a sealable opening therein, said envelope being at least partially evacuated to render said apparatus lighter than air, said envelope including a group of thin flexible high tensile strength sheets disposed in an overlapping side-by-side manner with adjacent ones of said sheets overlapping at their marginal edges, and sealed together at said overlapping marginal edges, each one of said sheets being composed of Mylar film; and outer frame means disposed within said envelope surrounding and engaging said inner frame for helping support said envelope, said outer frame means being composed of a stiff rigid open mesh material, the coarse openings in said inner frame being larger than the openings in said outer frame means.

2. Lighter-than-air apparatus according to claim 1, further including pumping means connected in fluid communication with said sealable opening for controlling the quantity of air contained in said envelope to determine the amount of lifting energy.

3. Lighter-than-air apparatus according to claim 1, wherein said frame members are each composed of tubular aluminum.

4. Lighter-than-air apparatus according to claim 1, wherein each one of said coarse openings is generally triangular in shape and certain ones of said sheets are generally triangular in shape and covering over corresponding ones of said coarse openings of said inner frame with said outer frame means being disposed therebetween.

5. Lighter-than-air apparatus according to claim 4, wherein said inner frame further includes a plurality of vertices, and said sheets include generally circular cap members for covering over said vertices.

6. Lighter-than-air apparatus according to claim 1, wherein said outer frame means rests on the inner frame.

7. Lighter-than-air apparatus according to claim 6, wherein each one of said coarse openings is generally triangular in shape and certain ones of said sheets are generally triangular in shape and covering over corresponding ones of said coarse openings of said inner frame with said outer frame means being disposed therebetween.

8. Lighter-than-air apparatus according to claim 7, wherein said inner frame further includes a plurality of vertices, and said sheets include generally circular cap members for covering over said vertices.

9. Lighter-than-air apparatus according to claim 8, further including pumping means connected in fluid communication with said sealable opening for controlling the quantity of air contained in said envelope to determine the amount of lifting energy.

10. Lighter-than-air apparatus according to claim 9, wherein said frame members are each composed of tubular aluminum.

* * * * *